United States Patent [19]

Kohlpaintner et al.

[11] Patent Number: 4,717,199
[45] Date of Patent: Jan. 5, 1988

[54] MOTOR VEHICLE ROOF WITH IMPROVED HEADLINING MOUNTING ARRANGEMENT

[75] Inventors: Georg Kohlpaintner, Martinsried; Horst Bienert, Gauting, both of Fed. Rep. of Germany

[73] Assignee: Webasto-Werk W. Baier GmbH & Co., Gauting, Fed. Rep. of Germany

[21] Appl. No.: 896,245

[22] Filed: Aug. 14, 1986

[30] Foreign Application Priority Data

Sep. 9, 1985 [DE] Fed. Rep. of Germany ....... 3532083

[51] Int. Cl.⁴ .......................... B60J 7/05; B60R 13/02
[52] U.S. Cl. ..................................... 296/214; 296/221; 296/216; 24/669; 24/677; 24/684
[58] Field of Search ............... 296/214, 216, 221, 222; 24/669, 670, 677, 684, 702, 625, 580, 563, 543

[56] References Cited

U.S. PATENT DOCUMENTS

| | | | |
|---|---|---|---|
| 2,505,955 | 5/1950 | Fuller | 24/580 X |
| 3,065,747 | 11/1962 | Forkel | 24/684 X |
| 3,741,592 | 6/1973 | Muncy | 24/543 X |
| 4,103,962 | 8/1978 | Schlapp | 296/222 X |
| 4,175,785 | 11/1979 | Leiter | 296/217 X |
| 4,332,416 | 6/1982 | Lutz et al. | 296/216 |

FOREIGN PATENT DOCUMENTS

| | | | |
|---|---|---|---|
| 1655543 | 7/1970 | Fed. Rep. of Germany | 296/222 |
| 2309318 | 10/1973 | Fed. Rep. of Germany | 296/222 |
| 2648664 | 5/1978 | Fed. Rep. of Germany | 296/221 |
| 3442615 | 5/1986 | Fed. Rep. of Germany | 296/221 |
| 89223 | 5/1984 | Japan | 296/216 |
| 95832 | 8/1922 | Switzerland | 24/670 |
| 143001 | 10/1930 | Switzerland | 24/669 |
| 2094723 | 9/1982 | United Kingdom | 296/221 |

Primary Examiner—Dennis H. Pedder
Attorney, Agent, or Firm—Sixbey, Friedman & Leedom

[57] ABSTRACT

Motor vehicle roof with a roof opening which can be closed by a cover that can slide and preferably be pivoted out. The underside of the cover is covered by a headlining, which, close to the cover front edge, is joined to the cover by at least one mounting device. The mounting device allows a height adjustment of the cover without affecting a flush-lifting of the headlining against a fixed roof frame bounding the roof opening. The mounting device includes an essentially vertical mounting pin and a catch clip that, by a relative movement in an essentially horizontal direction, can be brought to engage with each other. The catch clip in the engaged condition can be freely moved a limited distance with respect to the drive pin in the direction of the pin axis and can be freely tilted a limited angle with respect to the drive pin, as well as being swingable into a position permitting unobstructed upholstering of the headlining frame.

21 Claims, 8 Drawing Figures

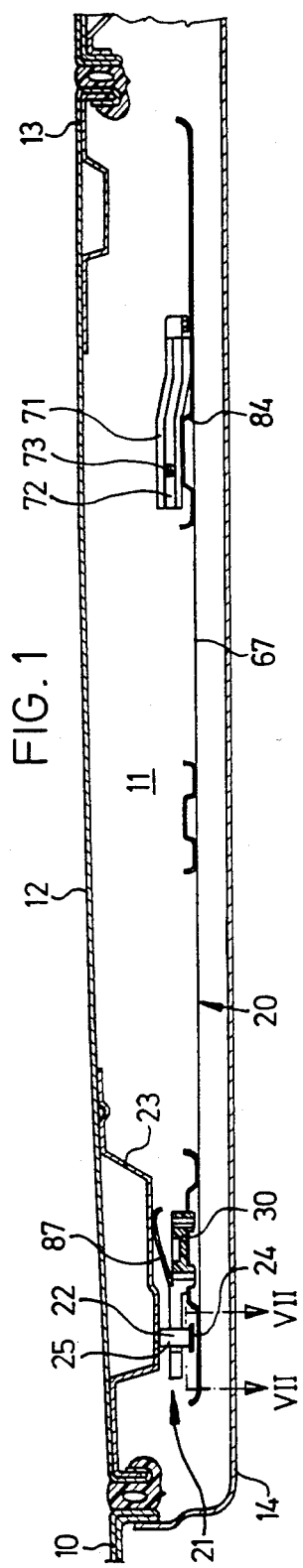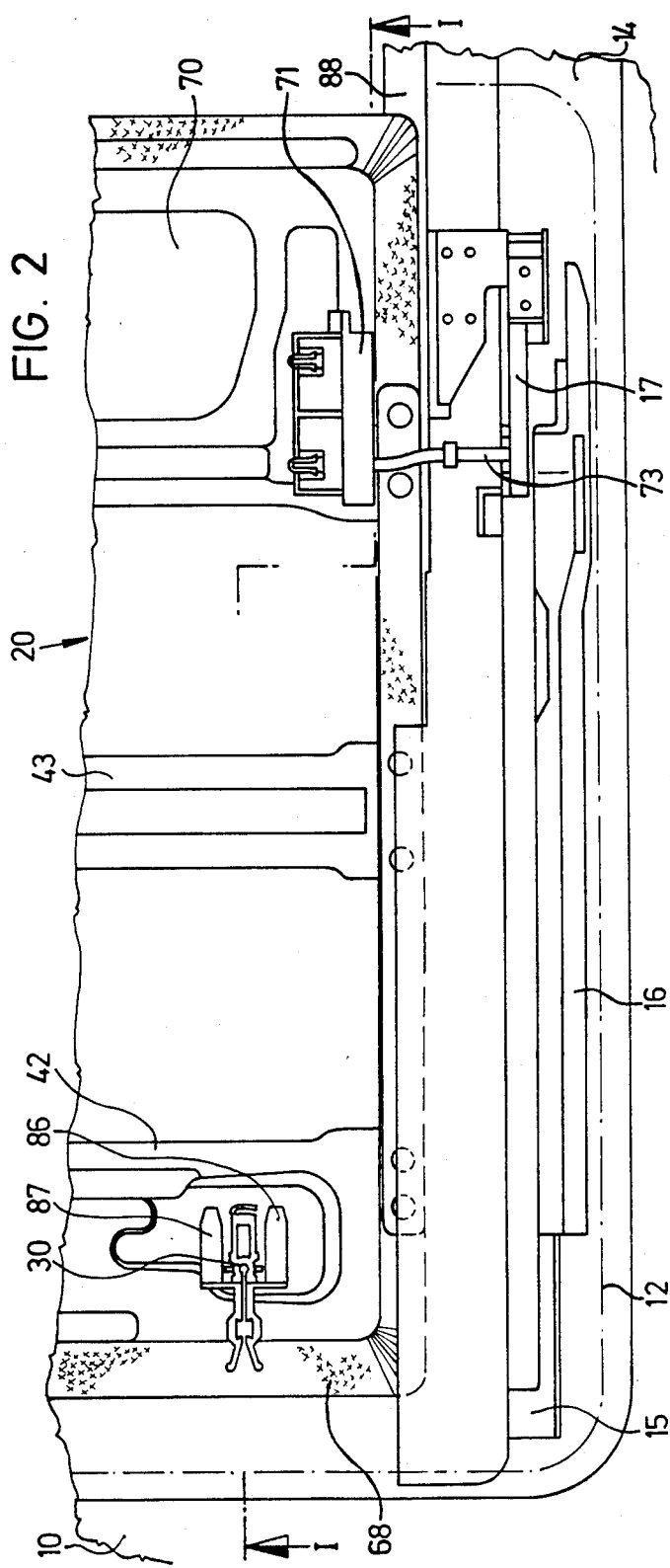

MOTOR VEHICLE ROOF WITH IMPROVED HEADLINING MOUNTING ARRANGEMENT

BACKGROUND AND SUMMARY OF THE INVENTION

The invention relates to a motor vehicle roof with a roof opening which can be closed by a cover than can slide and preferably also be pivoted out, whose underside is covered by a headlining which, close to the cover front edge is joined to the cover by an attachment arrangement which causes the headlining to be taken along with the cover, yet allows a height adjustment of the cover to be achieved without affecting a firm seating of the headlining against a fixed vehicle frame part bounding the roof opening.

In a known motor vehicle roof of this type (German Pat. No. 26 37 839 and corresponding U.S. Pat. No. 4,175,785), the attachment arrangement comprises flat springs which, on the one hand, are attached to the front part of a headlining frame and, on the other hand, to a rail, which, by clips, is connected to a cross strut on the underside of the cover. Instead of several flat springs and the rail, a spring strip designed like a rail and extending over the entire width of the cover, can be provided which is fastened along one longitudinal edge to the cover and along its other longitudinal edge to the lining frame. The spring or springs keep the headlining engaged with a flange of a roof frame surrounding the roof opening (a flange that serves as a lateral guide for the headlining) and this engagement is kept independent of the height adjustment of the cover with respect to the fixed roof surface.

The ability to adjust the height of the cover is necessary to align the cover, in the closed position, in relation to the fixed roof surface in the completed assembly of the vehicle. However, in the known arrangement with a change of the height adjustment of the cover with respect to the roof frame, and thus also with respect to the headlining, a force component is transmitted to the headlining, which is directed in the longitudinal direction of the vehicle, the force component may result in a misalignment of the headlining in the longitudinal direction of the vehicle. As a result undesirable gaps can occur in the closed cover position between the front edge or the back edge of the headlining and the adjacent roof frame parts. Moreover, the known arrangement requires a relatively large assembly height since, between the headlining and the end of the spring or springs to be connected to the cover, sufficient room must exist in the vertical direction for the spring or springs to be able to bend downward then press upward for an engagement of the clips on the cross strut of the cover.

In another known motor vehicle roof of the type initially mentioned (German Pat. No. 25 51 335 and corresponding U.S. Pat. No. 4,103,962) the cover is provided with front guide shoes on both sides, which are rigidly interconnected by a cross beam and which, serve for guiding the cover in its sliding movement and in respect to which the cover is adjustable in height. At least two bow-shaped stop springs are fastened to the headlining. These stop springs open toward the front and are placed at a distance from one another so as to engage a cross beam that is attached to the guide shoes when the headlining is shoved in from the back edge of the cover. In this case, a height adjustment of the cover has no effect on the alignment of the headlining. The additionally required cross beam, however, results in an undesirable increase in the overall weight of the roof.

Therefore, the invention has a primary object of providing a displaceable cover motor vehicle roof that is easy to assemble, in which the headlining is guided exactly independently of the height adjustment of the cover while taking up little assembly space in the vertical direction and, at the same time, being light in weight.

This object is attained in a motor vehicle roof of the initially identified type by connecting the headlining to the cover utilizing an essentially vertical attachment pin and a catch clip that, by a relative movement in an essentially horizontal direction, can be brought into an engaged condition with each other wherein the catch clip can be freely moved a limited distance with respect to the attachment pin in the direction of the pin axis and can be freely tilted a limited angle with respect to the attachment pin.

The motor vehicle roof according to the invention needs no additional cross beam that increases the weight. By said design of the attachment arrangement it is guaranteed that no forces are transmitted to the headlining which can shift the position of the headlining when the height of the cover is adjusted or, even, when the cover is pivoted out. Furthermore, the roof can be made very flat.

The catch clip advantageously has two spring legs lying next to one another that are able to be elastically spread out against their spring force and which, in the released condition, define an opening for receiving the attachment pin with a predetermined play. The vertical dimension of the spring legs is smaller than that of the attachment pin. Joining of the headlining to the cover is made very simply, by shoving of the headlining in a horizontal direction, especially from behind if the spring legs diverge from one another like a funnel on their free front ends. Thus, a self-centering with respect to the attachment pins is attained.

Advantageously the attachment pin is fastened to the cover or a front cover reinforcement while the catch clips are fastened on a lining frame of the headlining. But, basically, the arrangement can be reversed. It contributes to a simple assembly if the catch clip is, itself, clipped in the lining frame. Thus, advantageously, the lining frame, in the area of the clipping connection with the catch clip, is dome-shaped in such a way that, in the clipped condition, the lowermost exposed surface of the catch clip is on a level with or above the lowermost underside surface of the lining frame. In this way, the clipping connection becomes invisible behind the roof lining fabric made, for example, from textile material or plastic film. Moreover, such a solution also contributes to inside safety.

In accordance with another feature of the preferred embodiment, each catch clip is mounted to pivot with respect to the lining frame around an axis perpendicular to the major plane of the frame and, optionally, can be rotated into a working position and an upholstery position. This allows an upholstering of the lining frame with the headlining fabric unhindered by the catch clips. To avoid undesirable misalignments of the catch clips, the catch clips can engage with respect to the lining frame both in the working position and in the pivot position corresponding to the upholstery position.

For a reliable guiding of the headlining, the catch clip preferably carries at least a spring, which puts a prestress on the headlining in a direction away from the cover. In this way the headlining can be pressed elastically and with relatively slight force against guides fixed with the vehicle, e.g., a roof frame surrounding the roof opening on the one hand, to guarantee an easy sliding of the headlining but, on the other hand, to prevent rattling. The spring can be designed simply as a flat spring connected in one piece with the catch clip, i.e., as a unitary or integral part thereof, preferably as a single plastic molded part.

In another aspect of the invention, in the rear cover area, on each side of the cover, a guide fork is clipped to the headlining. The fork is designed as a molded plastic part with an integrated slide in which an adjustment pin is guidingly received. The adjustment pin projects laterally from a pivot lever serving for swiveling of the cover. Thus, an exact guiding of the headlining is further improved.

These and further objects, features and advantages of the present invention will become more obvious from the following description when taken in connection with the accompanying drawings which show, for purposes of illustration only, a single embodiments in accordance with the present invention.

BRIEF DESCRIPTION OF THE DRAWINGS

FIG. 1 is a diagrammatic longitudinal section through a vehicle roof along line I—I of FIG. 2;

FIG. 2 is a top view of the vehicle roof according to FIG. 1, but with the cover illustrated in phantom;

DETAILED DESCRIPTION OF THE PREFERRED EMBODIMENT

Figure 3:
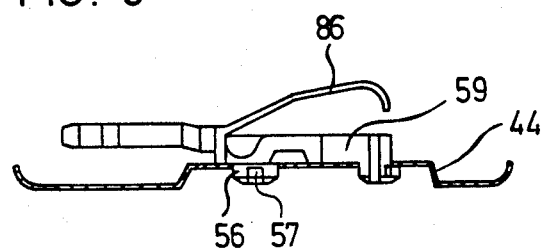
FIG. 3 is an enlarged side view of a catch clip clipped to the lining frame.

According to FIGS. 1 and 2, a rectangular roof opening 11, which can be closed by a cover 12, is formed in a fixed roof surface 10 of a motor vehicle. Cover 12 can either be pivoted out with its back edge 13 over solid roof surface 10, to ventilate the interior of the motor vehicle, or after lowering of back edge 13, can slide backward under solid roof surface 10. In FIG. 2, cover 12 is indicated only by a dot-dash line. Roof opening 11 is surrounded by a roof frame 14, which is connected to roof surface 10 in a way not shown in detail. Roof frame 14 carries or forms guide rails, which run along the side edges of roof opening 11 and in which front and rear sliders (guide shoes) are guided in a slidable manner in the longitudinal direction of the vehicle. The front sliders are placed on slider supports 15 of which only the left can be seen in FIG. 2. However, the right side of the arrangement is a mirror image of the left along a longitudinal plane of symmetry. Consequently only the design and mode of operation of one side are explained.

Slider support 15 is fixedly connected to a side panel 16 on which cover is supported in a height adjustable manner. Panel 16 engages a lifting lever 17 in its rearward area, by a sliding arrangement, one end of which (the lower end in the case of a venting cover position) is in hinged connection with the rear slider and can make a pivoting movement around a horizontal laterally extending axis. A pressure-resistant drive cable that can be moved by a manual or automatic drive engages the rear sliders on both sides of the cover respectively. If the rear sliders are moved further toward the front by the drive cable, going from closed cover position according to FIGS. 1 and 2, lifting levers 17 pivot out; cover 12 is pivoted around an axis lying close to its front edge, for example, determined by the front sliders. In this case, rear edge 13 of cover 12 is raised above fixed roof surface 10. On the other hand, if the rear sliders are moved rearward from the position according to FIGS. 1 and 2, cover 12 is lowered at its rear edge 13 and then moved under fixed roof surface 10 in a sliding movement.

The arrangement explained so far is known and consequently requires no further discussion. For example, the design can be according to German Pat. No. 29 14 855 and corresponding U.S. Pat. No. 4,332,416.

Figure 7:
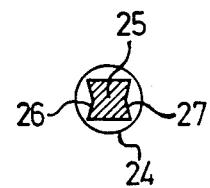
FIG. 7 is a cross section of an attachment pin corresponding to line VII—VII of FIG. 1.

A headlining 20 is connected to the front area of cover 12 by a pair of mounting devices 21, of which again, only the left one can be seen. Each mounting device 21 has an attachment pin 22, which is fastened to a cover reinforcement 23 and projects from it essentially perpendicularly (i.e., vertically) downward. Attachment pin 22 is, for example, riveted to cover reinforcement 23. Pin 22 has a shaft 25 of an essentially square cross section and a flat, broadened head 24 sitting on the lower end of shaft 25. As can be seen in FIG. 7, shaft 25 is provided on its front side and rear side with shallow recesses 26, 27, which are essentially triangular (i.e., are defined by a pair of V-shaped walls).

Figure 4:
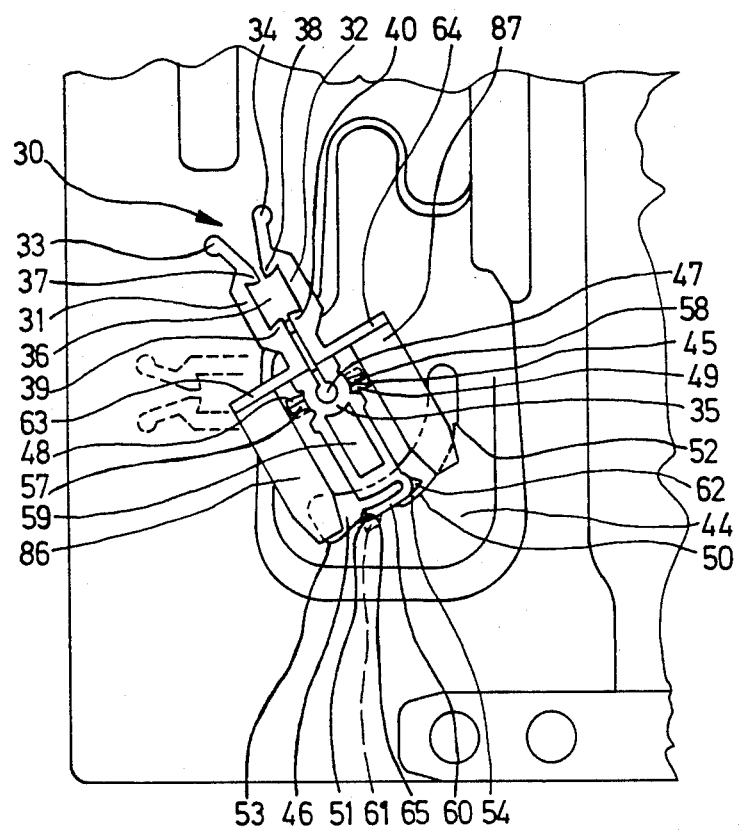
FIG. 4 is a top view of the front left corner of the lining frame with a mounted catch clip.

Each mounting device 21 also has a catch clip 30 designed as a molded plastic part. As can be seen particularly in FIG. 4, catch clip 30 has two spring legs 31, 32, lying side by side, which diverge at their free front ends 33, 34 like a funnel but are interconnected at a common opposite end 35. The material of catch clip 30 and the cross-sectional dimensions of spring legs 31, 32 are so chosen that spring legs 31, 32 by being placed against drive pin 22 and be exertion of pressure in the longitudinal direction of the vehicle can be spread out until drive pin 22 snaps into an opening 36 defined by spring legs 31, 32 (FIG. 1).

Opening 36 is so dimensioned that in the released condition of spring legs 31, 32, it receives shaft 25 of mounting pin 22 with a predetermined play, whereby front stop catches 37, 38 of spring legs 31, 32 engage front recess 26 and rear stop catches 39, 40 engage recess 27 of shaft 25 of mounting pin 22. Spring legs 31, 32 have a height that is less than the longitudinal dimension of shaft 25. Thus, drive pin 22 and catch clip 30 can slide freely along one another in the direction of the longitudinal pin axis for a limited distance. In addition, mounting pin 22 can be tilted relative to catch clip 30 when cover 12 is upwardly pivoted or when edge 13 thereof is lowered, before sliding of cover 12 rearward, without thereby transferring a significant force from mounting pin 22 to catch clip 30.

Catch clip 30 is clipped onto front cross bar 42 of a lining frame 43 of headlining 20. For this purpose, cross bar 42 is provided with an upwardly directed dome 44, in which two openings 45, 46 are formed. Opening 45 exhibits a circular central section 47 and two slot-shaped sections 48, 49 projecting radially from it in opposite directions. Opening 46 essentially has the shape of an arc, whose center is in the middle of opening 45. Two latches 51, 52 and two widenings 53, 54 are provided in periphery 50 of opening 46 lying at a distance from opening 45.

On the underside of catch clip 30 is ring-shaped bearing section 56 with two studs 57, 58 projecting radially outward. A center stud 59 is formed on end 35 of spring legs 31, 32, which essentially is a longitudinal extension of spring legs 31, 32. Center stud 59 is formed into a hook 60 on the end distant from spring legs 31, 32. Hook 60 is elastic in the direction of the longitudinal axis of center stud 59. On the underside of hook 60 are catch noses 61, 62.

To clip drive catch 30 onto lining frame 43 studs 57, 58 are lined up with slot-shaped sections 48, 49 of opening 45 and inserted through opening 45, just as is bearing section 56. At the same time catch noses 61, 62 are passed through opening 46 in the area of widening 53. Then drive catch 30 is rotated counterclockwise around bearing section 56 in FIG. 4 into the upholstery position shown there. In this position, studs 57, 58 and also catch nose 61 engage the underside of dome 44 of cross bar 42, while at the same time center stud 59 and cross struts 63, 64 of drive catch 30 are applied against the upper side of dome 44 of cross bar 42. Free end 65 of hook 60 engages latch 51 with its catch nose 61. Catch clip 30 consequently is held securely.

The vehicle manufacterer upholsters the lining frame 43 with a headlining fabric made of textile material or plastic film. In this case, lining fabric 67 is applied against the underside of lining frame 43, equipped with catch clips 30, and with its projecting edge 68 is wrapped upwardly around lining frame 43 and joined for example, glued, to the latter, as is indicated in FIG. 2. Catch clips 30, in the upholstering position, do not interfere with wrapping of lining fabric 67. Then catch clips 30 are rotated around the vertical axis determined by bearing section 56, into the working position, which can be seen in FIGS. 1 and 2 and is indicated by dotted lines in FIG. 4. In this working position, catch nose 61 on free end 65 of hook 60 engages behind latch 52 of opening 46 to prevent an unintended turning of drive catch 30 out of the working position. Catch noses 61, 62 both grasp cross bar 42.

Figure 5:
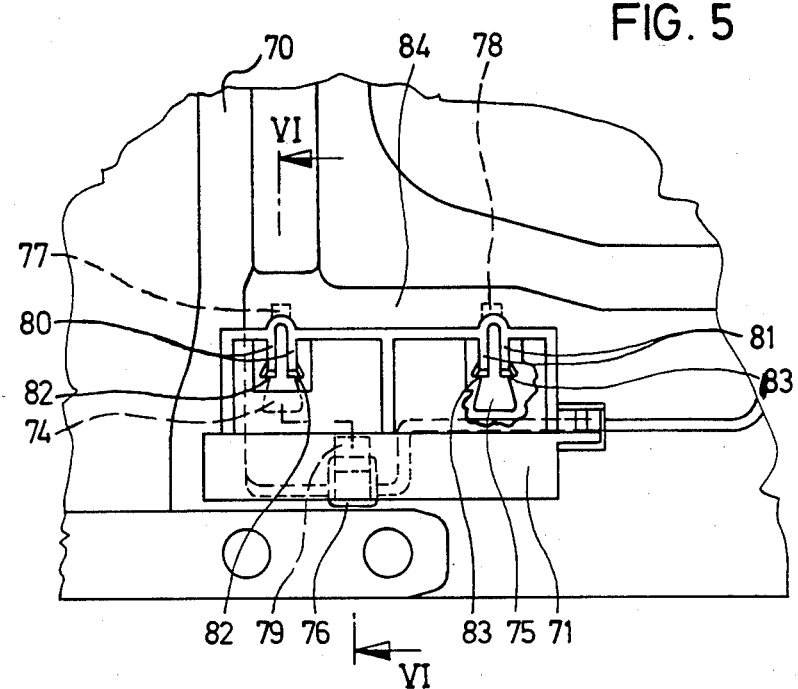
FIG. 5 is a top view of the left back part of the headlining with clipped guide fork.
Figure 6:
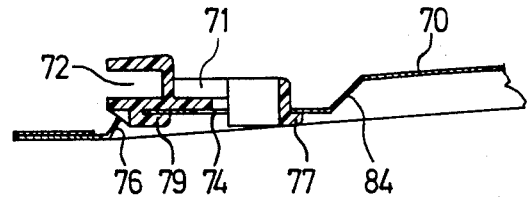
FIG. 6 is a section along line VI—VI of FIG. 5.
Figure 8:
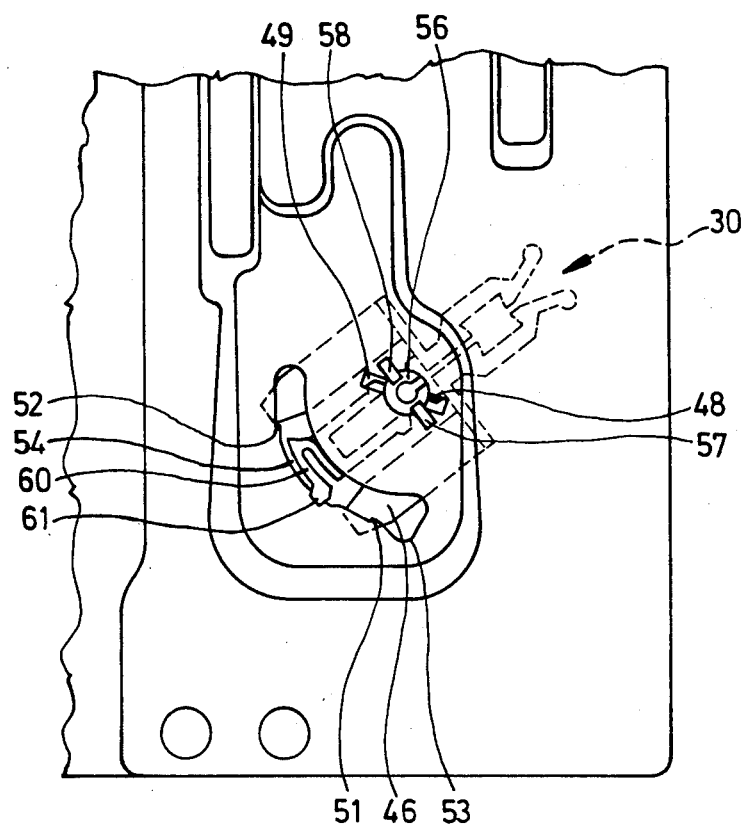
FIG. 8 is a bottom view corresponding to that of FIG. 4.

In the rear area of cover 12, a guide fork 71 is clipped to a rear cross bar 70 of lining frame 43 on each side of the cover. Each of guide forks 71 is designed as molded plastic part with an integrated slide 72 that is laterally inwardly open. The free end of an adjustment pin 73 engages slide 72 laterally at a distance from pivot lever 17. As can be seen especially in FIGS. 5 and 6, cross bar 70 is provided with openings 74, 75, 76 through which holding noses 77, 78 or 79 on the underside of guide fork 72 can be inserted. Elastic legs 80, 81 of guide fork 71 are applied in clipped condition against catch noses 82, 83, which are formed by openings 74, 75 in this way to exclude an unintended release of guide forks 71. As can be recognized from FIGS. 1 and 6, openings 74, 75 are in the area of an upwardly projecting dome 84 of cross bar 70.

It follows from FIG. 1 that, in the completely assembled condition of headlining 20 with clipped catch clips 30 and guide forks 71, the lowermost exposed surfaces of the catch clips and the guide forks lie above the lowermost underside surface of lining frame 43 due to the domes 44, 84. Headlining fabric 67, consequently, is stretched taut also in the area of catch clips 30 and guide forks 71, and so the existence of the catch clips and guide forks cannot be seen inside the vehicle.

For mounting of headlining 20, with catch clips 30 in the working position, the headlining 20 is shoved forwardly to bring funnel-like free front ends 33, 34 of spring legs 31, 32 into engagement with mounting pins 22. Spring legs 31, 32 are spread apart until finally each shaft 25 snaps into a respective opening 36. At the same time the ends of adjustment pins 73 are shoved into slides 72 of guide forks 71.

A rearwardly directed flat spring 86 or 87 extends from each of cross struts 63, 64 of catch clips 30. These flat springs 86, 87, in the assembled condition of headlining 20, are applied against the underside of cover reinforcement 23. In this way they press headlining 20, with a relatively slight force, downward against lateral support surfaces 88, on which the headlining can easily slide without rattling. A height adjustment of cover 12, for which means known in the art and not shown (e.g., according to DE-PS No. 29 14 855 and corresponding U.S. Pat. No. 4,332,416) can be provided, does not result in a misalignment of headlining 20, since flat springs 86, 87 can freely slide against cover 12 in a horizontal plane, while, as explained, also no forces are transmitted by mounting pins 22 to catch clips 30 and thus to lining frame 43, if such a height adjustment of the cover is made or the cover is tilted. Consequently, headlining 20, unaffected by the height adjustment of cover 12, is guided exactly opposite roof frame 14, to which guide forks 71 also contribute.

If cover 12 is shoved rearward from the closed position shown in FIG. 1, headlining 20 is driven by mounting pins 22 and catch clips 30 so as to move therewith. Thus, adjustment pin 73 travels toward the rear in slide 72. Since the back part of slide 72 is closer to the underside of headlining 20 than the front part of this slide, headlining 20 in its rear area is lifted with respect to roof frame 14, so that headlining 20 can run backward freely and without friction, if cover 12 is moved rearward.

Adjustment pin 73 is preferably made of metal, while guide fork 71, optionally, is made as a molded plastic part. The metal-plastic material mating makes it possible to let adjustment pin 73 run directly in slide 72, i.e., without addition slide rollers placed on the end of the adjustment pin. This makes it possible, in case of a specified distance between the underside of roof lining 20 and the upper side of guide fork 71 to see to a relatively great difference in height between the front and back ends of slide 72.

While we have shown and described various embodiments in accordance with the present invention, it is understood that the same is not limited thereto, but is susceptible of numerous changes and modifications as known to those skilled in the art, and I, therefore, do not wish to be limited to the details shown and ddescribed herein, but intend to cover all such changes and modifications as are encompassed by the scope of the appended claims.

We claim:

1. Motor vehicle roof with a roof opening and a cover by which the roof opening may be opened and closed, and an underside of the cover being covered by a headlining which, close to a front edge of the cover, is joined to the cover by at least one mounting device which allows a height adjustment of the cover relative to the headlining, wherein the mounting device comprises a vertically oriented mounting pin and a catch clip, said catch clip being engageable with the mounting pin by a relative movement between the catch clip and mounting pin in essentially only a horizontal direction, and wherein the catch clip, when engaged with the mounting pin, forms means for biasing said headlining in a downward direction relative to the cover and is movable a limited distance with respect to the mounting pin in an axial direction of the mounting pin and is tiltable a limited angle with respect to the mounting pin.

2. Motor vehicle roof according to claim 1, wherein the catch clip has a pair of elastically horizontally spreadable spring legs between which said mounting pin is passable in said horizontal direction and which, in a released condition, define an opening for receiving the mounting pin with a predetermined play and whose vertical dimension is smaller than that of a shank of the mounting pin.

3. Motor vehicle roof according to claim 2, wherein the spring legs diverge like a funnel at free front ends thereof.

4. Motor vehicle roof according to claim 3, wherein the mounting pin is carried by the cover and the catch clip is fastened on a lining frame of the headlining.

5. Motor vehicle roof according to claim 4, wherein the catch clip is clipped in the lining frame.

6. Motor vehicle roof according to claim 5, wherein the lining frame is dome-shaped in the area where the catch clip is clipped in such a way that, in the clipped condition, a lowermost exposed surface of the catch clip is at least as high as a lowermost underside surface of the lining frame.

7. Motor vehicle roof according to claim 4, wherein the catch clip is mounted to pivot with respect to the lining frame around an axis that is perpendicular to a major plane of the frame.

8. Motor vehicle roof according to claim 7, wherein the catch clip is pivotal into a working position for normal operation of the roof and an upholstering position providing free access for application of a lining material to the lining frame.

9. Motor vehicle roof according to claim 8, wherein the catch clip is engageable with said lining frame for holding the catch clip in each of said working and upholstering positions.

10. Motor vehicle roof according to claim 3, wherein the mounting pin is carried by a cover reinforcement and the catch clip is fastened on a lining frame of the headlining.

11. Motor vehicle roof according to claim 10, wherein the catch clip is clipped in the lining frame.

12. Motor vehicle roof according to claim 11, wherein the lining frame is dome-shaped in the area where the catch clip is clipped in such a way that, in the clipped condition, a lowermost exposed surface of the catch clip is at least as high as a lower covering surface of the lining frame.

13. Motor vehicle roof according to claim 12, wherein the catch clip is mounted to pivot with respect to the lining frame around an axis that is perpendicular to a major plane of the frame.

14. Motor vehicle roof according to claim 13, wherein the catch clip is pivotal into a working position for normal operation of the roof and an upholstering position providing free access for appication of a lining material to the lining frame.

15. Motor vehicle roof according to claim 14, wherein the catch clip is engageable within said lining frame for holding the catch clip in each of said working and upholstering positions.

16. Motor vehicle roof according to claim 2, wherein the catch clip carries at least one spring which puts a prestress on the headlining in a direction away from the cover.

17. Motor vehicle roof according to claim 16, wherein the spring is designed as a flat spring joined as one piece with the catch clip.

18. Motor vehicle roof according to claim 17, wherein the catch clip is a molded plastic part.

19. Motor vehicle roof according to claim 1, wherein in a rear area of the cover a respective guide fork is clipped at a side of the headlining, the fork being a molded plastic part with an integrated slide in which an adjustment pin is guided, said adjustment pin projecting laterally from a pivot lever serving for tilting of the cover.

20. Motor vehicle roof according to claim 15, wherein the catch clip carries at least one spring which puts a prestress on the headlining in a direction away from the cover.

21. Motor vehicle roof according to claim 1, wherein the mounting pin and catch clip are each vertically secured to a respective one of the cover and headlining.

* * * * *